United States Patent
Yamada et al.

(10) Patent No.: US 10,484,580 B2
(45) Date of Patent: Nov. 19, 2019

(54) IMAGE RECORDING APPARATUS

(71) Applicant: DENSO TEN Limited, Kobe-shi, Hyogo (JP)

(72) Inventors: Shimpei Yamada, Kobe (JP); Takashi Ogitani, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/878,706

(22) Filed: Jan. 24, 2018

(65) Prior Publication Data

US 2018/0220049 A1    Aug. 2, 2018

(30) Foreign Application Priority Data

Jan. 30, 2017 (JP) ................. 2017-014749

(51) Int. Cl.
| G01S 19/01 | (2010.01) |
| G01S 19/35 | (2010.01) |
| H04N 5/225 | (2006.01) |
| G01S 19/13 | (2010.01) |
| H01Q 1/22 | (2006.01) |
| H04N 7/18 | (2006.01) |

(52) U.S. Cl.
CPC ............ *H04N 5/2251* (2013.01); *G01S 19/13* (2013.01); *H01Q 1/2291* (2013.01); *H04N 7/183* (2013.01)

(58) Field of Classification Search
CPC .... H04N 5/2251; H04N 7/183; H01Q 1/2291; G01S 19/35; G01S 19/13
See application file for complete search history.

(56) References Cited

U.S. PATENT DOCUMENTS

| 5,657,073 A * | 8/1997 | Henley ................. G03B 37/04 348/38 |
| 5,760,931 A * | 6/1998 | Saburi ............... G02B 27/0101 359/13 |
| 5,899,956 A * | 5/1999 | Chan ...................... G01C 21/28 340/988 |
| 6,135,465 A * | 10/2000 | Chapman ................. B62D 7/02 280/103 |
| 6,201,642 B1 * | 3/2001 | Bos ......................... B60R 1/00 359/504 |
| 6,222,447 B1 * | 4/2001 | Schofield ............... B60N 2/002 340/461 |
| 6,481,858 B2 * | 11/2002 | Inagaki .................... B60R 1/06 248/476 |
| 6,520,642 B1 * | 2/2003 | Chapman ................. B62D 7/02 280/47.11 |

(Continued)

FOREIGN PATENT DOCUMENTS

| JP | H07-046460 A | 2/1995 |
| JP | 2003-146136 A | 5/2003 |

(Continued)

*Primary Examiner* — Philip P. Dang
(74) *Attorney, Agent, or Firm* — Oliff PLC

(57) ABSTRACT

An image recording apparatus includes: a camera unit that includes an image capturing lens, an image sensor, and a plurality of antenna modules each of which has a communication antenna; and a main unit that rotatably supports the camera unit so that an image capturing direction of the camera unit is (i) directed toward an outside of a vehicle and (ii) rotatable in an up-down direction. The main unit is configured to be installed on a window glass of the vehicle inside a cabin of the vehicle.

4 Claims, 4 Drawing Sheets

(56) References Cited

U.S. PATENT DOCUMENTS

| | | | | |
|---|---|---|---|---|
| 6,556,350 B2* | 4/2003 | Nakaho | | B60Q 1/2665 359/267 |
| 6,690,268 B2* | 2/2004 | Schofield | | B60C 23/00 340/438 |
| 6,717,610 B1* | 4/2004 | Bos | | B60R 1/00 340/436 |
| 6,811,270 B2* | 11/2004 | Yoshida | | B60R 1/06 359/507 |
| 7,209,221 B2* | 4/2007 | Breed | | B60N 2/002 356/28 |
| 7,532,175 B2* | 5/2009 | Aoki | | G02B 27/0101 345/7 |
| 7,579,940 B2* | 8/2009 | Schofield | | B60C 23/00 340/425.5 |
| 7,852,462 B2* | 12/2010 | Breed | | B60Q 9/008 356/28 |
| 8,126,324 B2* | 2/2012 | Young | | G01S 19/14 396/310 |
| 8,226,064 B2* | 7/2012 | Ohashi | | B60R 1/04 248/476 |
| 8,676,273 B1* | 3/2014 | Fujisaki | | H04M 1/6505 455/567 |
| 8,676,491 B2* | 3/2014 | Taylor | | B60C 23/0408 701/408 |
| 8,718,837 B2* | 5/2014 | Wang | | B25J 9/1689 701/2 |
| 8,818,042 B2* | 8/2014 | Schofield | | G06K 9/00818 382/104 |
| 8,964,298 B2* | 2/2015 | Haddick | | G06F 3/013 359/630 |
| 9,008,369 B2* | 4/2015 | Schofield | | G06K 9/00818 382/104 |
| 9,014,966 B2* | 4/2015 | Taylor | | B60C 23/0408 701/408 |
| 9,022,588 B2* | 5/2015 | Chino | | B60R 1/072 359/871 |
| 9,041,806 B2* | 5/2015 | Baur | | B60R 1/00 348/148 |
| 9,315,151 B2* | 4/2016 | Taylor | | B60C 23/0408 |
| 9,323,250 B2* | 4/2016 | Wang | | G05D 1/028 |
| 9,330,321 B2* | 5/2016 | Schamp | | B60R 21/0134 |
| 9,354,673 B2* | 5/2016 | Sakakibara | | H04M 1/026 |
| 9,469,250 B2* | 10/2016 | Lynam | | B60R 1/00 |
| 9,488,982 B2* | 11/2016 | Gurin | | B60W 50/085 |
| 9,618,747 B2* | 4/2017 | Villmer | | G02B 27/017 |
| 9,637,053 B2* | 5/2017 | Schofield | | B60C 23/00 |
| 9,638,537 B2* | 5/2017 | Abramson | | G01C 21/3626 |
| 2004/0121820 A1* | 6/2004 | Unno | | B60R 1/06 455/569.2 |
| 2005/0162513 A1* | 7/2005 | Chan | | G07C 5/085 348/118 |
| 2006/0048800 A1* | 3/2006 | Rast | | A47L 1/02 134/56 R |
| 2006/0170881 A1* | 8/2006 | Seki | | G03B 21/10 353/85 |
| 2006/0209522 A1* | 9/2006 | Yang | | G06F 1/1616 361/801 |
| 2009/0096870 A1* | 4/2009 | Zheng | | B60K 35/00 348/148 |
| 2009/0104955 A1* | 4/2009 | Yamamoto | | A63H 18/00 463/6 |
| 2013/0100289 A1* | 4/2013 | Arant | | H04N 7/18 348/148 |
| 2013/0176401 A1* | 7/2013 | Monari | | H04N 5/2252 348/47 |
| 2013/0257712 A1* | 10/2013 | Imamura | | H01Q 1/243 345/156 |
| 2014/0146132 A1* | 5/2014 | Bagnato | | G02B 27/2228 348/36 |
| 2014/0197649 A1* | 7/2014 | Hansen | | B60R 11/04 292/336.3 |
| 2014/0214276 A1* | 7/2014 | Yamamoto | | B60R 1/00 701/41 |
| 2015/0085435 A1* | 3/2015 | Sakakibara | | H04M 1/026 361/679.3 |
| 2015/0165977 A1* | 6/2015 | Huang | | B60R 1/10 359/850 |
| 2016/0152187 A1* | 6/2016 | Kawashiri | | B60R 3/00 280/163 |
| 2016/0159411 A1* | 6/2016 | Kawashiri | | B62D 33/0617 296/190.09 |
| 2016/0167476 A1* | 6/2016 | Kawashiri | | B60R 1/06 296/190.09 |
| 2016/0176347 A1* | 6/2016 | Kiehl | | B60R 11/04 348/148 |
| 2016/0179236 A1* | 6/2016 | Shin | | G06F 1/1616 345/173 |
| 2016/0185275 A1* | 6/2016 | Kawashiri | | B60Q 1/18 362/549 |
| 2016/0185297 A1* | 6/2016 | Boehm | | B60R 1/12 348/148 |
| 2016/0185299 A1* | 6/2016 | Kawashiri | | B60R 1/06 362/549 |
| 2016/0243942 A1* | 8/2016 | Sato | | G02B 27/0149 |

FOREIGN PATENT DOCUMENTS

| | | |
|---|---|---|
| JP | 2005-328208 A | 11/2005 |
| JP | 2013-054749 A | 3/2013 |

* cited by examiner

IMAGE RECORDING APPARATUS

BACKGROUND OF THE INVENTION

Field of the Invention

The invention relates to an image recording apparatus.

Description of the Background Art

Conventionally, an image recording apparatus that can change a direction of capturing an image has been known. Such an image recording apparatus includes a camera unit and a main unit. The main unit supports the camera unit so that the camera unit rotates, and thus the direction of capturing the images can be changed. Moreover, the main unit is installed on a window or a windshield of a vehicle inside a cabin of the vehicle. Recently, an image recording apparatus has been proposed that includes a main unit having an antenna module that includes a communication antenna.

However, the image recording apparatus that includes the main unit having the antenna module has a problem of variation in antenna performance of the antenna module because a tilt angle of the window/windshield of the vehicle on which the image recording apparatus is installed varies, depending on type of the vehicle.

SUMMARY OF THE INVENTION

According to one aspect of the invention, an image recording apparatus includes: a camera unit that includes an image capturing lens, an image sensor, and a plurality of antenna modules each of which has a communication antenna; and a main unit that rotatably supports the camera unit so that an image capturing direction of the camera unit is (i) directed toward an outside of a vehicle and (ii) rotatable in an up-down direction. The main unit is configured to be installed on a window glass of the vehicle inside a cabin of the vehicle.

Since the image capturing direction of the camera unit can be adjusted, antenna performance of the antenna module can be stable.

According to another aspect of the invention, in the image recording apparatus, one of the plurality of antenna modules is a GPS antenna module having a GPS antenna. The GPS antenna module is located on the camera unit so that an antenna surface of the GPS antenna module faces vertically upward.

Since the GPS antenna module is located on the camera unit so that an antenna surface of the GPS antenna module faces vertically upward, antenna performance of the GPS antenna module can be stable.

Therefore, an object of the invention is to cause the antenna performance of an image recording apparatus to be stable.

These and other objects, features, aspects and advantages of the invention will become more apparent from the following detailed description of the invention when taken in conjunction with the accompanying drawings.

DESCRIPTION OF THE EMBODIMENTS

Figure 1:
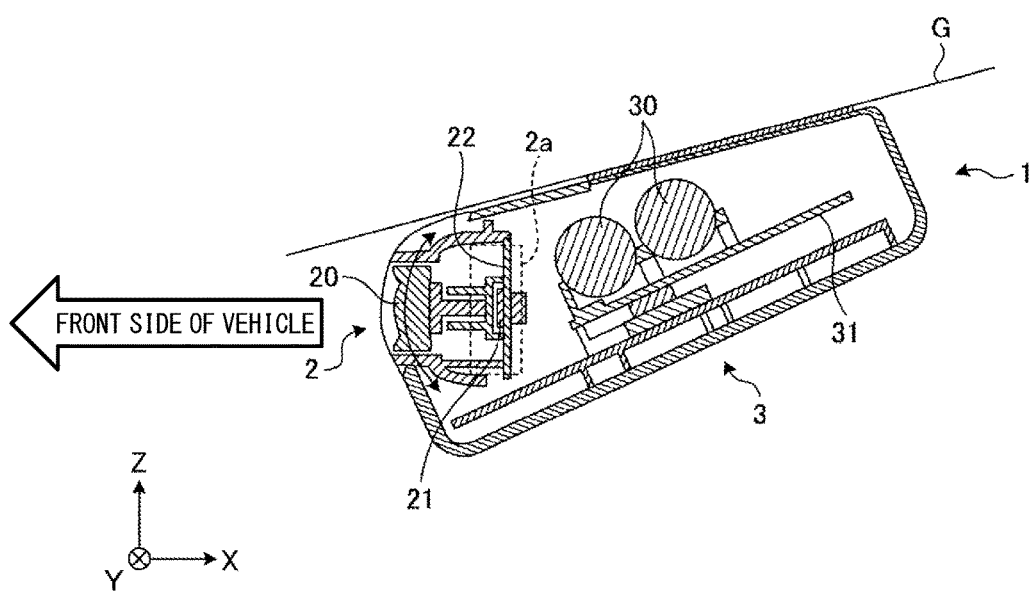
FIG. 1 illustrates a sectional view showing an outline of a driving recorder of an embodiment.

An image recording apparatus of this embodiment will be described below in detail, with reference to the attached drawings. The embodiment described below does not intend to limit the invention. Dimensional relations and percentages among elements in the drawings may be different from actual dimensional relations and percentages thereof. Moreover, dimensional relations and percentages among the drawings may also be different from actual dimensional relations and percentages thereof.

<1. Outline of an Image Recording Apparatus>

First, the image recording apparatus of this embodiment will be described, taking a driving recorder (car video recorder) as an example. FIG. 1 illustrates a sectional view showing an outline of a driving recorder 1 of this embodiment. For easy understanding, a three dimensional Cartesian coordinate is included in FIG. 1 to define a front side of a vehicle as a negative X-axis direction and an upper side in a vertical direction as a positive Z-axis direction. The Cartesian coordinate will be also included in some drawings that will be used for later explanation.

As shown in FIG. 1, the driving recorder 1 is installed on a front windshield G of the vehicle inside a cabin of the vehicle, and is a recording apparatus that captures an image of an area in front of the vehicle.

The driving recorder 1 includes a camera unit 2 and a main unit 3. The camera unit 2 includes an image capturing lens 20 and an image sensor 21. The main unit 3 supports the camera unit 2 so that (i) a direction in which the camera unit 2 captures the images (image capturing direction) is directed toward an outside of the vehicle and (ii) the image capturing direction of the camera unit 2 is rotatable in an up-down direction (a Z-axis direction). The main unit 3 is configured to be installed on the front windshield G of the vehicle inside the cabin of the vehicle.

The image capturing lens 20 captures the images of the area in front of the vehicle. The image sensor 21 converts light focused by the image capturing lens 20, into electrical signals.

The camera unit 2 includes a camera board 22 having the image sensor 21. The main unit 3 includes a printed wiring board 31 on which a capacitor 30, an electronic part (not illustrated) that receives image data captured by the image sensor 21, and the like are mounted.

The camera unit 2 and the main unit 3 are electrically connected to each other via a flexible substrate, not illustrated. The image data is sent from the image sensor 21 to the printed wiring board 31, via the flexible substrate.

Here, a conventional driving recorder will be described. In the conventional driving recorder, an antenna module is mounted on a printed wiring board of a main unit to perform communication via a communication antenna.

In this case, an orientation of an antenna surface of the antenna module is determined by a tilt angle of a front windshield of a vehicle. In other words, the orientation of the antenna surface of the antenna module depends on the tilt angle of the front windshield of the vehicle.

In other words, the orientation of the antenna surface of the conventional driving recorder varies, depending on a type of the vehicle on which the driving recorder is installed. Thus, there is a problem that antenna performance of the antenna module varies.

Therefore, in the driving recorder 1 of this embodiment, an antenna module is located on the camera unit 2.

More specifically, the antenna module is provided to an arrangement region 2a of the camera unit 2 shown by a dotted line in FIG. 1. The arrangement region 2a is an area that includes the camera board 22 and a space inside a case of the camera unit 2.

As described above, the antenna module is located on the camera unit 2 of which the image capturing direction can be adjusted to a predetermined direction regardless of a tilt angle of the front windshield G of the vehicle. Thus, the antenna performance of the antenna module mounted on the driving recorder 1 is stable.

A plurality of types of the antenna modules can be mounted on the camera unit 2 of the driving recorder 1. That will be described later in detail, with reference to FIG. 3.

<2. Detailed Structure of the Driving Recorder>

Figure 2:
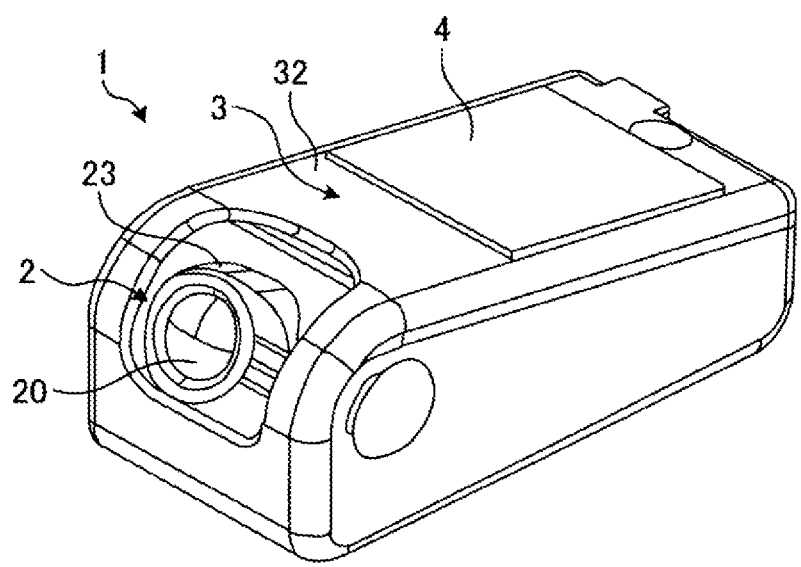
FIG. 2 illustrates a perspective view of an external appearance of the driving recorder of the embodiment.
Figure 3:
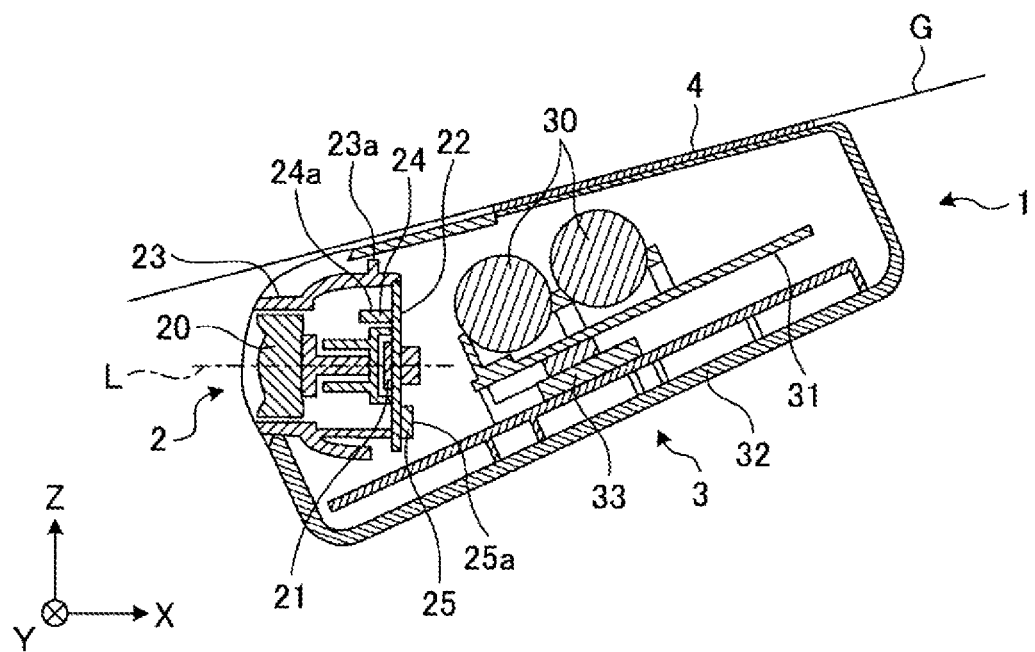
FIG. 3 illustrates a sectional side view of the driving recorder of the embodiment.

Next, a structure of the driving recorder 1 of this embodiment will be described in detail with reference to FIGS. 2 and 3. FIG. 2 illustrates a perspective view of an external appearance of the driving recorder 1 of this embodiment. FIG. 3 illustrates a sectional side view of the driving recorder 1 of this embodiment. This embodiment will describe a case in which the antenna module is located on the camera board 22 of the camera unit 2.

The driving recorder 1 shown in FIGS. 2 and 3 is an example, and the detailed structure and the like are not limited to the structure shown in FIGS. 2 and 3. Moreover, constituent elements that have functions same as the functions of the constituent elements shown in FIG. 1 are given same numerical references shown in FIG. 1, and explanation thereof will be omitted.

As shown in FIG. 2, the driving recorder 1 includes: the camera unit 2 having a case 23 of which a sectional view is convex; and the main unit 3 having a case 32 that is box-shaped. The camera unit 2 includes the cylindrical image capturing lens 20 inside the case 23. The main unit 3 includes an installation portion 4 on an upper surface (which is in contact with the front windshield G in FIG. 1) of the case 32 to attach the driving recorder 1 to the front windshield G of the vehicle.

Thus, the driving recorder 1 is attached to a surface of the front windshield G of the vehicle via the adhesive surface of the installation portion 4. In other words, a position of the main unit 3 of the driving recorder 1 is determined by the tilt angle of the front windshield G of the vehicle.

FIG. 3 illustrates a case in which the driving recorder 1 is attached to the front windshield G inside the cabin of the vehicle of which the front windshield G has a relatively small tilt angle relative to a horizontal surface in an X-axis direction.

As shown in FIG. 3, the convex-shape case 23 of the camera unit 2 is provided to the box-shaped case 32 to be located inside the case 32 so that the image capturing direction of the camera unit 2 is rotatable in the up-down direction (the Z-axis direction) relative to the surface of the front windshield G of the vehicle.

More specifically, an engagement portion 23a provided to an outer surface of the case 23 of the camera unit 2 is caused to engage with arbitrary one of a plurality of engaged portions (not illustrated) provided to an inner surface of the case 32 of the main unit 3 at predetermined intervals. Thus, the image capturing direction of the camera unit 2 can be adjusted.

In other words, an orientation of the camera unit 2 is adjusted by manually causing the engagement portion 23a to engage with one of the predetermined engaged portions, so that an optical axis L of the image capturing lens 20 is, for example, substantially horizontal to a road surface when the driving recorder 1 is attached to the front windshield G of the vehicle.

More specifically, when the driving recorder 1 is attached to the front windshield G of the vehicle inside the cabin of the vehicle, the upper surface of the main unit 3 of the driving recorder 1 is attached to the front windshield G via a double-stick tape (not illustrated) provided to the adhesive surface of the installation portion 4 to have the main unit 3 facing the front windshield G.

Next, the camera unit 2 is manually rotated so that the image capturing lens 20 of the camera unit 2 horizontally (in the X-axis direction) faces the area in front of the vehicle. Then, the engagement portion 23a provided to the outer surface of the case 23 of the camera unit 2 is caused to engage with arbitrary one of the plurality of engaged portions provided to the inner surface of the case 32 of the main unit 3. Thus, the image capturing direction of the camera unit 2 is fixed.

The driving recorder 1 is attached to a predetermined location of the front windshield G of the vehicle as described above, and then the image capturing direction of the camera unit 2 is manually adjusted properly. The image capturing direction of the camera unit 2 is adjusted, for example, by 10 degrees.

As described above, the driving recorder 1 of this embodiment captures the images of an appropriate image capturing region in front of the vehicle on the front windshield G of the vehicle.

<3. Detailed Structure of the Camera Unit>

Next, a structure of the camera unit 2 will be described in detail. The camera unit 2 includes, in the case 23, the camera board 22 on which the image sensor 21 is mounted. Moreover, the camera unit 2 includes a Global Positioning System (GPS) antenna module 24 and a wireless Local Area Network (LAN) antenna module 25.

The GPS antenna module 24 includes a GPS antenna, and performs a wireless communication via the GPS antenna. The GPS antenna module 24 is located on a surface of the camera board 22 on a side thereof that faces toward the image capturing lens 20.

More specifically, the GPS antenna module 24 is located on the surface of the camera board 22 on the side thereof that faces toward the image capturing lens 20 so that an antenna surface 24a of the GPS antenna module 24 faces vertically upward (the positive Z-axis direction).

Thus, the antenna surface 24a of the GPS antenna module 24 located on the camera board 22 always faces vertically upward (the positive Z-axis direction) (an outside of the cabin of the vehicle). Therefore, the GPS antenna module 24 successfully receives GPS signals sent from, for example, GPS satellites.

The wireless LAN antenna module 25 includes a wireless LAN antenna, and performs a wireless communication via the wireless LAN antenna. The wireless LAN antenna module 25 is located on a surface of the camera board 22 on a side thereof opposite to the side of the camera board 22 that faces toward the image capturing lens 20.

More concretely, the wireless LAN antenna module 25 is located on the surface of the camera board 22 on the side thereof opposite to the side of the camera board 22 that faces toward the image capturing lens 20 so that an antenna surface 25a of the wireless LAN antenna module 25 faces a direction (a positive X-axis direction) opposite to the image capturing direction.

Thus, the antenna surface 25a of the wireless LAN antenna module 25 located on the camera board 22 always faces an inside of the cabin of the vehicle. Therefore, the wireless LAN antenna module 25 successfully sends and receives, for example, Wi-Fi (registered trademark) signals, Bluetooth (registered trademark) signals, etc., to/from a mobile communication device (cell phone, smartphone, etc.) in the cabin of the vehicle.

Moreover, the main unit 3 includes, in the case 32, a memory card 33 that is a memory medium to store the images captured by the camera unit 2. The memory card 33 is removably provided to the case 32 of the main unit 3. The main unit 3 of the driving recorder 1 includes an insertion slot (not illustrated) on a surface in a positive or negative Y-axis direction, for the memory card 33 to be inserted and removed.

Next described with reference to FIG. 4 will be a case in which a tilt angle of a front windshield of the vehicle relative to the horizontal surface in the X-axis direction is greater as compared to the case shown in FIG. 3. Buses and trucks are among examples of the vehicle of which a front windshield has a relatively great tilt angle.

Figure 4:
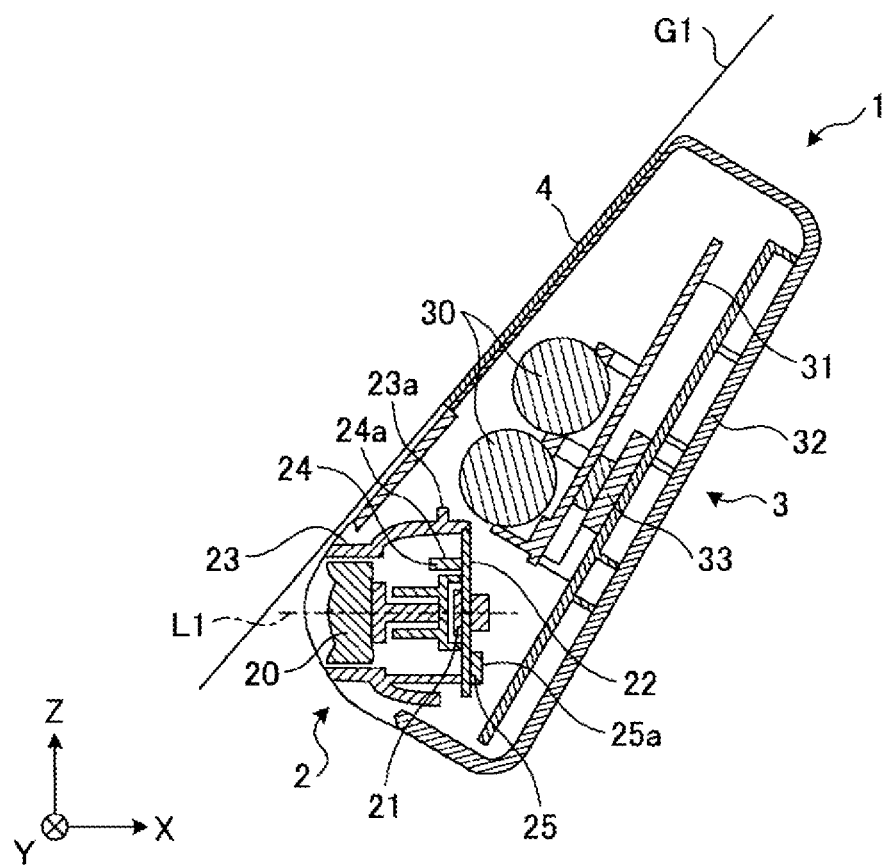
FIG. 4 illustrates a case in which the driving recorder of the embodiment is attached to a vehicle front windshield that has a relatively great tilt angle.

FIG. 4 illustrates a case in which the driving recorder 1 of this embodiment is attached to a front windshield G1 of a vehicle, that has a relatively great tilt angle. Moreover, constituent elements that have functions same as the functions of the constituent elements shown in FIG. 3 are given same numerical references shown in FIG. 3, and explanation thereof will be omitted.

As shown in FIG. 4, when the driving recorder 1 is attached to the front windshield G1 of the vehicle inside a cabin of the vehicle, the upper surface of the main unit 3 of the driving recorder 1 is attached to the front windshield G1 via the double-stick tape (not illustrated) provided to the adhesive surface of the installation portion 4, as described above, to have the main unit 3 facing the front windshield G1.

Next, the camera unit 2 is manually rotated so that the image capturing lens 20 of the camera unit 2 faces the area in front of the vehicle horizontally (in the X-axis direction). Then, the engagement portion 23a provided to the outer surface of the case 23 of the camera unit 2 is caused to engage with arbitrary one of the plurality of engaged portions provided to the inner surface of the case 32 of the main unit 3. Thus, the image capturing direction of the camera unit 2 is fixed.

As shown in FIGS. 3 and 4, the camera unit 2 is fixed to the main unit 3, with an orientation of the camera unit 2 relative to the main unit 3 in the up-down direction set so that an angle of the optical axis L of the image capturing lens 20 relative to the road surface and an angle of the optical axis L1 of the image capturing lens 20 relative to the road surface are substantially same, regardless of the tilt angle of the front windshield G or the front windshield G1 of the vehicle, i.e., the optical axes L and L1 of the image capturing lens 20 are at a predetermined angle relative to the road surface, regardless of the tilt angles of the front windshield G and the front windshield G1 of the vehicle.

Thus, the antenna surface 24a of the GPS antenna module 24 and the antenna surface 25a of the wireless LAN antenna module 25 of the camera unit 2 always face the predetermined direction, regardless of the tilt angle of the front windshield G or the front windshield G1 of the vehicle.

More specifically, the antenna surface 24a of the GPS antenna module 24 is fixed to always face vertically upward (in the positive Z-axis direction), regardless of the tilt angle of the front windshield G or the front windshield G1 of the vehicle.

Thus, for example, the GPS antenna module 24 stably and successfully receives the GPS signals sent from the GPS satellites, regardless of the tilt angle of the front windshield G or the front windshield G1 of the vehicle.

Moreover, the antenna surface 25a of the wireless LAN antenna module 25 is fixed to face the direction (the positive X-axis direction) opposite to the image capturing direction, regardless of the tilt angle of the front windshield G or the front windshield G1 of the vehicle.

Thus, the wireless LAN antenna module 25 is independent of the tilt angle of the front windshield G or the front windshield G1 of the vehicle so that the wireless LAN antenna module 25 stably and successfully sends and receives signals to/from the mobile communication device in the cabin of the vehicle.

As described above, the image capturing direction of the driving recorder 1 of this embodiment is directed toward the outside of the vehicle. The GPS antenna module 24 and the wireless LAN antenna module 25 are located on the camera unit 2 of which the image capturing direction is rotatable in the up-down direction (the Z-axis direction).

In other words, the driving recorder 1 of the foregoing embodiment includes the GPS antenna module 24 and the wireless LAN antenna module 25 that are located on the camera unit 2 of which an angle is adjustable so that the GPS antenna module 24 and the wireless LAN antenna module 25 face the predetermined direction, regardless of the tilt angle of the front windshield G or the front windshield G1 of the vehicle.

Thus, the driving recorder 1 of the foregoing embodiment is independent of the tilt angle of the front windshield G or the front windshield G1 of the vehicle so that the antenna performance of the GPS antenna module 24 and the wireless LAN antenna module 25 included in the driving recorder 1 is stable.

Moreover, in the driving recorder 1 of the foregoing embodiment, the antenna surface 24a of the GPS antenna module 24 is located on the camera unit 2 so as to face vertically upward (the positive Z-axis direction).

Thus, the driving recorder 1 of the foregoing embodiment is independent of the tilt angle of the front windshield G or the front windshield G1 of the vehicle so that the driving recorder 1 stably and successfully receives the signals from the GPS satellite.

In the driving recorder 1 of the foregoing embodiment, the antenna surface 25a of the wireless LAN antenna module 25 is located on the camera unit 2 so as to face the direction (the positive X-axis direction) opposite to the image capturing direction.

Thus, the driving recorder 1 of the foregoing embodiment is independent of the tilt angle of the front windshield G or the front windshield G1 of the vehicle so that the driving recorder 1 stably and successfully sends and receives signals to/from the mobile communication device in the cabin of the vehicle.

In the driving recorder 1 of the foregoing embodiment, the GPS antenna module 24 and the wireless LAN antenna module 25 are located on the camera unit 2, not to the main unit 3.

In other words, a region for the main unit 3 can be downsized by efficient use of a region for the camera unit 2. Thus, the driving recorder 1 can be thinner or downsized.

In the driving recorder 1 of the foregoing embodiment, the GPS antenna module 24 is located on the surface of the camera board 22 on the side thereof that faces toward the image capturing lens 20.

Thus, in the driving recorder 1 of the foregoing embodiment, the antenna surface 24*a* of the GPS antenna module 24 located on the camera board 22 always faces vertically upward (the positive Z-axis direction) (the outside of the cabin of the vehicle). Therefore, the GPS antenna module 24 successfully receives the GPS signals sent from, for example, the GPS satellites.

In the driving recorder 1 of the foregoing embodiment, the wireless LAN antenna module 25 is located on the surface of the camera board 22 on the side thereof opposite to the side the camera board 22 that faces toward the image capturing lens 20.

Thus, in the driving recorder 1 of the foregoing embodiment, the antenna surface 25*a* of the wireless LAN antenna module 25 located on the camera board 22 always faces the inside of the cabin of the vehicle. Therefore, the wireless LAN antenna module 25 successfully sends and receives, for example, the Wi-Fi (registered trademark) signals, the Bluetooth (registered trademark) signals, etc. to/from the mobile communication device (cell phone, smartphone, etc.) in the cabin of the vehicle.

In the driving recorder 1 of the foregoing embodiment, the GPS antenna module 24 and the wireless LAN antenna module 25 are located on the camera board 22. Thus, a surface mounting area is secured on the printed wiring board 31 for a device other than the device that processes the captured image data.

In the driving recorder 1 of the foregoing embodiment, the camera unit 2 is fixed to the main unit 3 with an orientation of the camera unit 2 relative to the main unit 3 in the up-down direction set so that an angle of the optical axis L of the image capturing lens 20 relative to the road surface and an angle of the optical axis L1 of the image capturing lens 20 relative to the road surface are substantially same, regardless of the tilt angle of the front windshield G or the front windshield G1 of the vehicle, i.e., the optical axes L and L1 of the image capturing lens 20 are at a predetermined angle relative to the road surface, regardless of the tilt angles of the front windshield G and the front windshield G1 of the vehicle.

Thus, the GPS antenna module 24 and the wireless LAN antenna module 25 located on the camera unit 2 are independent of the tilt angle of the front windshield G or the front windshield G1 of the vehicle so that the antenna performance of the GPS antenna module 24 and the wireless LAN antenna module 25 is stable.

The driving recorder 1 of this embodiment is independent of the tilt angle of the front windshield G or the front windshield G1 of the vehicle so that the driving recorder 1 captures the images of the appropriate image capturing region in front of the vehicle.

<4. Modifications>

In the forgoing embodiment, the GPS antenna module 24 and the wireless LAN antenna module 25 are located on the camera board 22. However, in the camera unit 2, a location on which the GPS antenna module 24 and the wireless LAN antenna module 25 are located is not limited to the camera board 22. In other words, the GPS antenna module 24 and the wireless LAN antenna module 25 may be located in a space in the case 23 of the camera unit 2.

For example, a convexity that faces in parallel to the camera board 22 may be provided to an inner surface of the case 23 of the camera unit 2. The GPS antenna module 24 is located on a surface of the convexity on a side of the convexity that faces toward the image capturing lens 20 so that the antenna surface 24*a* of the GPS antenna module 24 faces vertically upward (the positive Z-axis direction). Moreover, the wireless LAN antenna module 25 is located on a surface of the convexity on a side of the convexity opposite to the side of the convexity that faces toward the image capturing lens 20 so that the antenna surface 25*a* of the wireless LAN antenna module 25 faces the direction (the positive X-axis direction) opposite to the image capturing direction.

In such a manner, the GPS antenna module 24 and the wireless LAN antenna module 25 are independent of the tilt angle of the front windshield G or the front windshield G1 of the vehicle so that the antenna performance of the GPS antenna module 24 and the wireless LAN antenna module 25 is stable in the driving recorder 1, as similar to the embodiment described above.

Moreover, one of the GPS antenna module 24 and the wireless LAN antenna module 25 may not be provided. Further, an antenna module that is located on the camera unit 2 is not limited to the GPS antenna module 24 or the wireless LAN antenna module 25. Another antenna module may be provided to the camera unit 2.

In a case where another antenna module is used, the antenna module is located on the camera board 22 or in a space of the case 23 of the camera unit 2 so that an antenna surface of the antenna module faces vertically upward (the positive Z-axis direction) (the outside of the cabin of the vehicle) or a direction (the positive X-axis direction) (the inside of the cabin of the vehicle) opposite to the image capturing direction, in accordance with a function of the antenna module.

Moreover, another antenna module may be located on the camera unit 2 in addition to the GPS antenna module 24 and the wireless LAN antenna module 25.

In the foregoing embodiment, the driving recorder 1 is attached to the front windshield G or the front windshield G1 of the vehicle, and then the image capturing direction of the camera unit 2 is adjusted by manually causing the engagement portion 23*a* to engage with the predetermined engaged portion. However, a method of adjusting the image capturing direction of the camera unit 2 is not limited to the manner described above.

As anther embodiment, the image capturing direction of the camera unit 2 may be automatically rotated by a rotation device (e.g., a motor) in the up-down direction (the Z-axis direction) relative to the front windshield G or the front windshield G1. In such an embodiment, the driving recorder 1 is attached to the front windshield G or the front windshield G1 of the vehicle, and then the image capturing direction of the camera unit 2 may be automatically adjusted by the rotation device. Thus, an installation work of the driving recorder 1 can be simplified.

Moreover, in a case where the image capturing direction of the camera unit 2 is deviated from the predetermined direction due to a long term use of the driving recorder 1 after the driving recorder 1 was installed, the image capturing direction of the camera unit 2 can be automatically adjusted to the predetermined direction by the rotation device.

Therefore, in such an embodiment, even in the long term use of the driving recorder 1, the stable performance of the GPS antenna module 24 and the wireless LAN antenna module 25 can be available.

In the foregoing embodiment, the driving recorder 1 is attached to the front windshield G or the front windshield G1 inside the cabin of the vehicle. However, a manner in which the driving recorder 1 is installed is not limited to the embodiment described above.

As another embodiment, as long as the driving recorder 1 captures an image of surroundings of the vehicle, the driving recorder 1 may be installed to a rear windshield of the vehicle, a ceiling of the cabin, an upper area of a dashboard or an arbitrary position of the vehicle, besides the front windshield G and the front windshield G1 of the vehicle.

The foregoing embodiment describes the case in which the antenna modules are located on the camera unit 2 of the driving recorder 1. However, it is possible to provide an antenna module to a rotatable camera unit of, for example, a monitor recorder that is installed on a wall of a building to monitor an object, an area, etc.

In such a case, the antenna module located on the rotatable camera unit of the monitor recorder and the like is independent of a tilt angle of the wall of the building so that antenna performance of the antenna module is stable.

More effects and modifications of the embodiment can be easily derived by a person skilled in the art. Thus, the specific details and the representative embodiment described above do not intend to limit broader modes of the invention. Therefore, various changes are possible without departing from the comprehensive and conceptive spirit or scope of the invention defined by the attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image recording apparatus comprising:
   a camera unit that is a second case at least a portion of an outer surface of which is convex, the camera unit including:
      an image capturing lens;
      an image sensor; and
      a plurality of antenna modules each of which has a communication antenna, the plurality of antenna modules including:
         a GPS antenna module having a GPS antenna, the GPS antenna module being located on the camera unit so that an antenna surface of the GPS antenna module faces vertically upward; and
         a wireless LAN antenna module having a wireless LAN antenna, the wireless LAN antenna module being located on the camera unit so that an antenna surface of the wireless LAN antenna module faces a direction opposite to an image capturing direction of the camera unit; and
   a main unit that includes a first case that is box-shaped, an outer surface of the first case of the main unit being configured to be installed on a window glass of a vehicle inside a cabin of the vehicle, the main unit rotatably supporting the second case, which is the camera unit, inside the first case of the main unit so that the second case rotates within and relative to the first case and so that the image capturing direction is (i) directed toward an outside of the vehicle, (ii) directed toward a front of the vehicle, and (iii) rotatable in an up-down direction.

2. The image recording apparatus according to claim 1, wherein:
   the camera unit includes a camera board on which the image sensor is mounted;
   the GPS antenna module is located on a first surface of the camera board on a side of the camera board that faces toward the image capturing lens; and
   the wireless LAN antenna module is located on a second surface of the camera board on a side of the camera board opposite to the side of the camera board that faces toward the image capturing lens.

3. The image recording apparatus according to claim 1, wherein
   the camera unit is fixed to the main unit with an orientation of the camera unit relative to the main unit in the up-down direction set so that an optical axis of the image capturing lens is at a predetermined angle relative to a road surface, regardless of a tilt angle of the window glass of the vehicle.

4. The image recording apparatus according to claim 1, wherein
   the camera unit includes a camera board on which the image sensor is mounted; and
   the wireless LAN antenna module is located on a surface of the camera board on a side of the camera board that faces away from the image capturing lens.

* * * * *